United States Patent [19]
Holden et al.

[11] Patent Number: 4,764,888
[45] Date of Patent: Aug. 16, 1988

[54] N-BIT CARRY SELECT ADDER CIRCUIT WITH DOUBLE CARRY SELECT GENERATION

[75] Inventors: Kirk N. Holden; Ashok H. Someshwar, both of Austin, Tex.

[73] Assignee: Motorola, Inc., Schaumburg, Ill.

[21] Appl. No.: 835,135

[22] Filed: Mar. 3, 1986

[51] Int. Cl.[4] .............................................. G06F 7/50
[52] U.S. Cl. .................................................. 364/788
[58] Field of Search ......................... 364/784, 786–788

[56] References Cited

U.S. PATENT DOCUMENTS

| | | | |
|---|---|---|---|
| 3,100,835 | 8/1963 | Bedrij | 364/788 |
| 3,993,891 | 11/1976 | Beck et al. | 364/788 X |
| 4,525,797 | 6/1985 | Holden | 364/788 |
| 4,573,137 | 2/1986 | Ohhashi | 364/788 |
| 4,675,837 | 6/1987 | Ulbrich et al. | 364/788 |
| 4,675,838 | 6/1987 | Mazin et al. | 364/788 |
| 4,682,303 | 7/1987 | Uya | 364/788 |

OTHER PUBLICATIONS

IBM Tech Disclosure Bulletin, vol. 28 No. 1, Jun. 1985, pp. 68–70, "Modified ones complement carry-completion-sensing adder".

Schmookler, "Design of Large ALUs Using Multiple PLA Macros", IBM J. Res. Develop. vol. 24, No. 1, Jan. 1980, pp. 2–14.

Primary Examiner—Gary V. Harkcom
Assistant Examiner—Tan V. Mai
Attorney, Agent, or Firm—John A. Fisher; Jeffrey Van Myers; Robert L. King

[57] ABSTRACT

A circuit for adding two N-bit binary numbers with an input carry bit, where N is an integer, by the carry select technique is provided. A ranked ordered plurality of section adders function in conjunction with rank ordered carry select logic circuits to initially provide two sum bits and two output carry bits for each bit position corresponding to carry input bits of zero and one, respectively. The section adders comprise full adders and are divided into at least two ranked groups in which sum bits are concurrently calculated in each group. Each full adder concurrently provides two sum bits for each rank ordered output sum bit. The rank ordered carry select logic circuits sequentially provide carry select bits which are used by the full adders to select one of the two sum bits as the output sum bit. Two output carry bits are concurrently provided by each group. One of the two output carry bits of the lowest ranked group is provided as a half carry output bit in response to the carry input bit. One of the two output carry bits of the highest ranked group is provided as the sum output carry bit in response to the half carry bit of the lower ranked group.

7 Claims, 3 Drawing Sheets

N-BIT CARRY SELECT ADDER CIRCUIT WITH DOUBLE CARRY SELECT GENERATION

TECHNICAL FIELD

This invention relates generally to adder circuits, and more particularly, to adder circuits performing carry select addition.

BACKGROUND ART

As electronic processors advance in processing capability, the need for high speed adders which add very large bit size operands directly increases. Unfortunately, conventional adders which have been used in eight and sixteen bit applications become unacceptably slow for thirty-two, sixty-four and higher bit applications. For example, carry select adders such as the adder taught by Bedrij in U.S. Pat. No. 3,100,835 entitled "Selecting Adder" have ranked ordered adders which typically receive carry inputs from each previous bit stage to select a proper carry bit. Therefore, if a large number of bits are implemented, the number of inputs required for the higher order sections which is known as "fan-in" is tremendously large and impractical. The same type of fan-in problem also exists for conventional carry look-ahead adders.

BRIEF DESCRIPTION OF THE INVENTION

Accordingly, an object of the present invention is to provide an improved carry select adder circuit for high speed addition.

Another object of the present invention is to provide an improved adder circuit with minimal interconnect and circuitry required to implement high order bit applications.

A further object of the present invention is to provide an improved circuit for adding operands having large bit width.

Yet another object of the present invention is to provide an improved carry select adder circuit with double carry select generation.

In carrying out the above and other objects of the present invention, there is provided, in one form, a circuit for simultaneously adding n bits of a first and a second operand and simultaneously outputting n sum bits and an output carry bit in response to a control signal. A rank ordered plurality of parallel connected section adders is divided into at least first and second separate groups wherein each section adder provides a predetermined portion of the n sum bits. Each section adder comprises a rank ordered plurality of full adder circuits and first multiplexors. Each full adder has a first sum input for receiving a predetermined bit of the first operand, a second sum input for receiving a predetermined bit of the second operand, and first and second carry-in inputs. The first carry-in input of all adders of each plurality except the lowest ranked adder receives a carry-out bit from a full adder of immediately lower rank resulting from a forced carry-in of logic zero to the first carry-in input of the full adder of lowest rank of each plurality. The second carry-in input of all adders of each plurality except the lowest ranked adder receives a carry-out bit from a full adder of immediately lower rank resulting from a forced carry-in of logic one to the second carry-in input of the full adder of lowest rank of each plurality. A first sum output of each full adder provides a first sum bit of predetermined rank which corresponds to a forced carry-in of logic zero, and a second sum output of each adder provides a second sum bit of the same predetermined rank which corresponds to a forced carry-in of logic one. First and second carry-out bits of each adder correspond to forced carry-in bits of logic one and zero, respectively. The first plurality of multiplexors is coupled to the first and second sum outputs of each of the full adders. Each multiplexor of the first multiplexors selects one of the first or second sum bits which are provided by each full adder in response to both the control signal and predetermined first and second carry select signals of a rank ordered plurality of carry select signals. The selected output sum bits represent the output sum. A first plurality of rank ordered carry select logic circuits is provided wherein each carry select logic circuit of the first plurality is coupled to a predetermined section of full adder circuits in each group of adders. The lowest ranked carry select logic circuit of the first plurality in each group receives both a forced carry-in bit of logic one and first and second carry-out bits from the corresponding section of full adder circuits and provides the first carry select signal of a predetermined rank for each group. The remaining carry select logic circuits of the first plurality in each group each receives the first carry select signal of immediately lower rank and first and second carry-out bits from the corresponding section of full adder circuits and provides the first carry select signal of a predetermined rank. The highest ranked carry select logic circuit of the first plurality provides a first carry output bit associated with the addition assuming a carry input bit of logic one. A second plurality of rank ordered carry select logic circuits is provided with each carry select logic circuit of the second plurality being coupled to a predetermined section of full adder circuits of each group of adders. The lowest ranked carry select logic circuit of the second plurality in each group receives a forced carry-in bit of logic zero and first and second carry-out bits from the corresponding section of full adder circuits and provides the second carry select signal of a predetermined rank. The remaining carry select logic means of the second plurality in each portion receives the second carry select signal of immediately lower rank and first and second carry-out bits from the corresponding section of full adder circuits and provides the second carry select signal of a predetermined rank. The highest ranked carry select logic circuit of the second plurality provides a second carry output bit associated with the addition which represents an assumed carry input bit of logic zero. A second multiplexor is coupled to the first and second pluralities of carry select logic means for providing one of the first or second carry output bits as the output carry bit.

These and other objects, features and advantages will be more clearly understood from the following detailed description taken in conjunction with the accompanying drawings.

DETAILED DESCRIPTION OF THE INVENTION

Figure 1A:
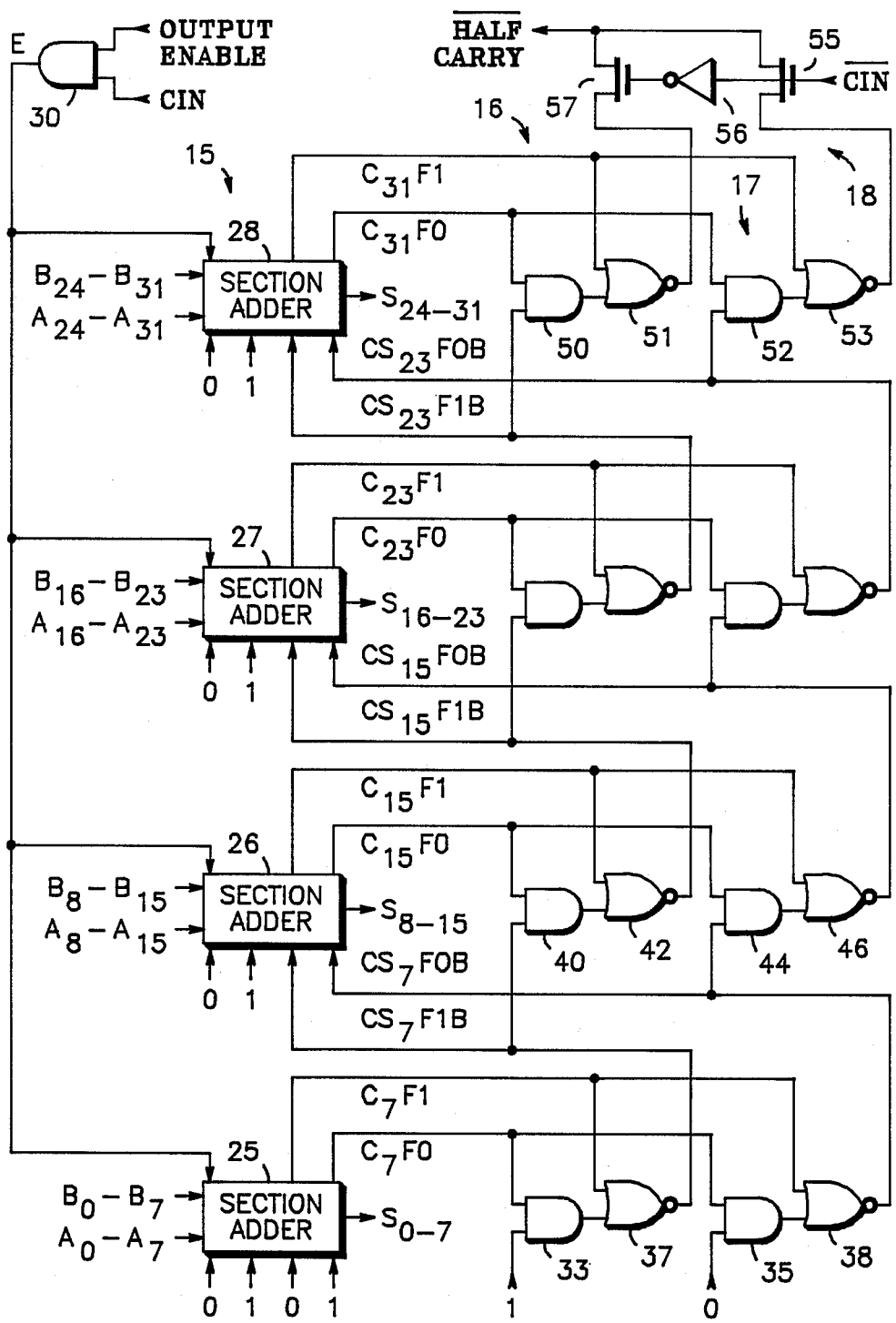
FIGS. 1(A) and 1(B) respectively illustrate in block diagram form lower and upper order portions of a carry select adder in accordance with the present invention.
Figure 1B:
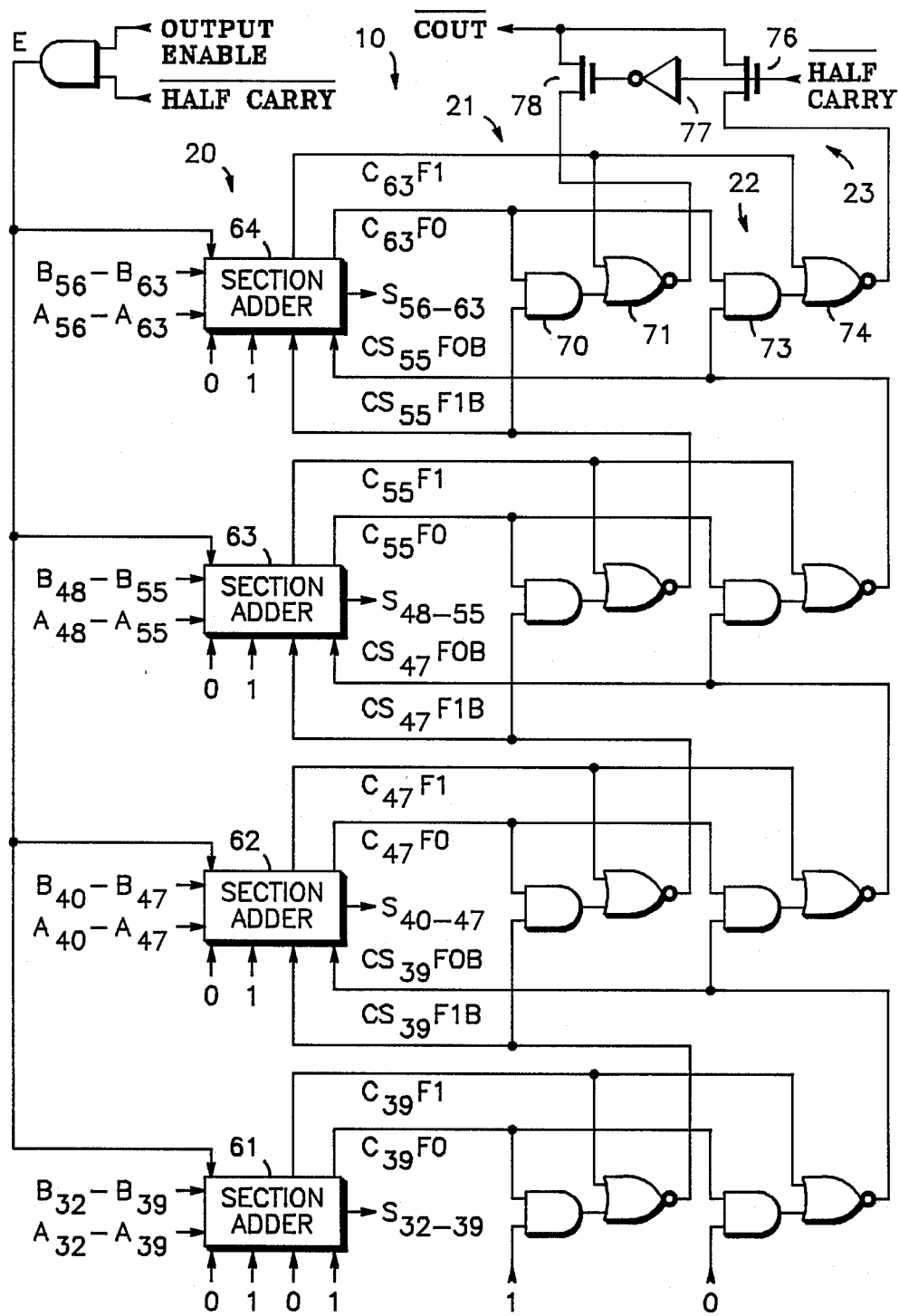

Shown in FIGS. 1(A) and 1(B) is a carry select adder 10 for adding input operands A and B taking into consideration a carry-in bit, $C_{IN}$. In the illustrated form, the operation of adder 10 may be more readily understood if FIG. 1(A) is placed directly below FIG. 1(B). Adder 10 is illustrated as having two portions wherein portion 11 a high order portion and portion 12 is a low order portion. It should be readily understood that the present invention may be practiced by using more than two portions and with any operand bit size. In the illustrated form, sixty-four bit operands are illustrated to provide a sixty-four bit sum with a carry-out bit, $C_{OUT}$. Low order portion 12 generally comprises a plurality of section adders 15, a first plurality of carry select logic circuits 16, a second plurality of carry select logic circuits 17 and a multiplexor 18. High order portion 11 generally comprises a plurality of section adders 20, a first plurality of carry select logic circuits 21, a second plurality of carry select logic circuits 22 and a multiplexor 23.

Section adders 15 are illustrated in FIG. 1(A) as comprising rank ordered section adders 25, 26, 27 and 28. Section adder 25 receives bits zero thru seven of both input operands A and B, whereas section adder 26 receives bits eight thru fifteen and so forth. Each of section adders 25 thru 28 has a first carry input terminal for receiving a fixed logic zero level and a second carry input terminal for receiving a fixed logic one level. Each of section adders 25–28 has first and second carry select input terminals. The first and second carry select input terminals of lowest ranked section adder 25 are coupled to logic zero and logic one levels, respectively. The first and second carry select input terminals of section adders 26–28 are each connected to a ranked carry select output from each of carry select circuits 16 and 17 and having a rank immediately lower than the lowest ranked input operand bit of each section adder. For example, the first carry select input terminal of section adder 27 which receives a lowest ranked input operand bit of sixteen is connected to a carry select signal labeled $CS_{15}F0B$, and the second carry select input terminal of section adder 27 is connected to a carry select signal labeled $CS_{15}F1B$. Each of section adders 25–28 also has a control input connected to a control signal labeled "E". An AND gate 30 provides control signal "E" at an output thereof. A first input of AND gate 30 is coupled to an "Output Enable" signal, and a second input of AND gate 30 is coupled to the carry-in bit $C_{IN}$. Each of section adders 25–28 has a sum output terminal for providing a plurality of rank ordered sum bits which are available in parallel fashion. For example, section adder 27 provides sum bits sixteen thru twenty-three. Ranked ordered carry select logic circuits 16 and 17 each comprise a rank ordered plurality of AND and NOR gates. It should be readily apparent that the function of carry select logic circuits 16 and 17 may be implemented with circuits other than the illustrated AND and NOR gates which implement the logical equivalence of logic circuits 16 and 17. The lowest ranked section adder 25 has a first carry-out bit from bit position seven corresponding to an assumed carry-in bit of zero, labeled $C_7F0$, connected to a first input of an AND gate 33 and to a first input of an AND gate 35. A second input of AND gate 33 is connected to a forced logic state of one, and a second input of AND gate 35 is connected to a forced logic state of zero. A second carry-out bit of section adder 25 from bit position seven corresponding to an assumed carry-in bit of one, labeled $C_7F1$, is connected to a first input of a NOR gate 37 and to a first input of a NOR gate 38. An output of AND gate 33 is connected to a second input of NOR gate 37, and an output of AND gate 35 is connected to a second input of NOR gate 38. An output of NOR gate 37 provides a first rank ordered carry select input bit, labeled $CS_7F1B$, which is a carry select bit resulting from the addition of bits $A_0$–$A_7$ and $B_0$–$B_7$ assuming a carry-in bit of one.

In the illustrated form, the letter "B" in the carry select bit designation and in all other bit designations is used to represent an active low signal as that term is used in a conventional sense. In other words, an active low signal is designated to be present in a true sense when the signal has a logic zero state. This chosen designation has no relation to the B operand.

Again referring to FIG. 1(A), an output of NOR gate 38 provides a second rank ordered carry select input bit, labeled $CS_7F0B$, which is a carry select bit resulting from the addition of bits $A_0$–$A_7$ and $B_0$–$B_7$ assuming a carry-in bit of zero. Each of the rank ordered section adders receives only two carry select input bits which will be described in further detail below. In a similar manner, analogously connected rank ordered AND and NOR gates are connected with section adders of corresponding rank. The carry select output of NOR gate 37 is also connected to a first input of an AND gate 40. A second input of AND gate 40 is connected to a first carry-out bit from section adder 26 corresponding to an original carry-in bit of logic state zero. An output of AND gate 40 is connected to a first input of an OR gate 42 which provides a first carry select bit, $CS_{15}F1B$, section adder 27. Similarly, the second carry select bit for section adder 26 provided by OR gate 38 is also connected to a first input of an AND gate 44. A second input of AND gate 44 is connected to a carry-out bit from section adder 26 corresponding to an original carry-in bit of logic state zero. An output of AND gate 44 is connected to a first input of a NOR gate 46 which provides a second carry select bit, $CS_{15}F0B$, for section adder 27. A second input of each of OR gate 42 and OR gate 46 is connected to a second carry-out bit $C_{15}F1$ from section adder 26.

In the illustrated form, the highest ranked section adder of low order portion 12 is section adder 28 which has a first carry-in input connected to a forced logic zero state and a second carry-in input connected to a forced logic one state. A first carry select input of section adder 28 is connected to a first ranked carry select bit corresponding to a forced carry-in bit of one at the lowest ranked carry select logic circuit of circuits 16. The first ranked carry select bit is also connected to a first input of section adder 28 of and AND gate 50. A second carry select input is connected to a second ranked carry select bit corresponding to a forced carry-in bit of zero at the lowest ranked carry select logic circuit of circuits 17. The second ranked carry select bit is also connected to a first input of an AND gate 52. A second input of each of AND gates 50 and 52 is connected to a ranked carry-out bit of section adder 28 which corresponds to an assumed carry-in bit of zero. An output of AND gate 50 is connected to a first input of a NOR gate 51. A second input of NOR gate 51 is connected to a carry-out bit of section adder 28 resulting from an assumed carry-in bit of one. An output of NOR gate 51 provides a first "half" carry bit in complement form from carry select logic circuits 16 assuming a carry-in bit of one. An output of AND gate 52 is connected to a first input of a NOR gate 53. A second input of NOR gate 53 is connected to a carry-out bit of section adder 28 resulting from an assumed carry-in bit of one. An output of NOR gate 53 provides a second "half" carry bit in complement form from carry select logic circuits 17 assuming a carry-in bit of zero.

Multiplexor 18 comprises a first transistor switch 55 having a first current electrode connected to the output of NOR gate 53. A second current electrode of transistor switch 55 is connected to an output for providing a carry bit from low order portion 12 which is the "half" carry bit in complement form. The "half" carry bit is so called because this carry bit represents the actual carry bit at the halfway point in the addition calculation. Obviously if the invention is implemented in more than two portions, the output carry bit of the lowest ranked portion is not a true half carry bit. The carry-in bit in complement form is coupled to both a gate of transistor switch 55 and to an input of an inverter 56. An output of inverter 56 is connected to a gate of a transistor switch 57. A first current electrode of transistor switch 57 is connected to the output of NOR gate 51, and a second current electrode of transist stitch 57 is connected to the output for providing the half carry bit in complement form.

High order portion 11 is analogous in structure to low order portion 12. The plurality of section adders 20 comprises a rank ordered plurality of section adders 61–64. Lowest ranked section adder 61 receives a fixed logic zero value and a fixed logic one value at first and second carry select inputs, respectively, whereas the remaining section adders receive a carry select signal from carry select logic circuits of immediately lower rank. Carry select logic circuits 21 and 22 each comprises a plurality of rank ordered AND and OR gates which are coupled in the same way as in the low order portion in which each provides a ranked carry select signal as labeled in FIG. 1(B). For purposes of avoiding redundancy, each analogous structural connection of carry select logic circuits in the high order portion 11 of adder 10 will not be reiterated. The highest ranked carry select logic circuit of the plurality of circuits 21 comprises an AND gate 70 having a first input for receiving the highest ranked carry select signal assuming a forced carry-in of one, $CS_{55}F1B$, in an active low form. A second input of AND gate 70 is connected to a carry-out signal, $C_{63}F0$, from section adder 64 assuming a forced carry-in bit of zero. An output of AND gate 70 is connected to a first input of a NOR gate 71. A second input of NOR gate 71 is connected to a carry-out bit, $C_{63}F1$, of section adder 64 assuming a forced carry-in bit of one. An output of NOR gate 71 provides a first output carry bit resulting from the addition and assuming a carry-in bit of one.

The highest ranked carry select logic circuit of the plurality of circuits 22 comprises an AND gate 73 having a first input for receiving the highest ranked carry select signal assuming a forced carry-in of zero, $CS_{55}F0B$, which is an active low signal. A second input of AND gate 73 is connected to the carry-out signal, $C_{63}F0$, from section adder 64 assuming a forced carry-in bit of zero. An output of AND gate 73 is connected to a first input of a NOR gate 74. A second input of NOR gate 74 is connected to the carry-out bit, $C_{63}F1$, of section adder 64 assuming a forced carry-in bit of one. An output of NOR gate 74 provides a second output carry bit resulting from the addition and assuming a carry-in bit of zero.

Multiplexor 23 comprises a transistor switch 76 having a first current electrode connected to the output of NOR gate 74, a gate coupled to the complement of the half carry-out bit from multiplexor 18, and a second current electrode for selectively providing the output carry bit in complement form. The complement of the half carry bit is inverted by inverter 77 and connected to a gate of a transistor switch 78. Switch 78 has a first current electrode connected to the output of NOR gate 71. A second current electrode of switch 78 selectively provides the output carry bit in complement form. The enable signal E for high order portion 11 is again provided by an AND gate (not numbered) having the output enable signal coupled to a first input thereof and having the half carry signal in complement form coupled to a second input thereof.

In operation, adder 10 functions to simultaneously receive bits zero thru sixty-three of operands A and B in parallel fashion. Generally, adder 10 simultaneously forms two distinct sums where a carry-in bit of zero and a carry-in bit of one are respectively assumed. A predetermined portion of the two sums is provided by each section adder. The lowest ranked full adder of each section adder receives fixed logic zero and logic one carry-in bits. Therefore, generation of two sums can be effected very quickly. By dividing the long bit string into at least two groups of section adders, each group more efficiently calculates a sum. The correct output sum bit is chosen in response to the generated carry select bit. Two carry select bits are also provided wherein a carry select bit for both possible logic states of the carry-in bit is generated in response to forced carry-in bits representing the two possible logic states of the actual carry-in bit. It should be noted that previous adder circuits have typically coupled a single carry-in bit into carry generation circuitry and an output sum was delayed until the correct output carry bit was singularly propagated thru the carry generation circuitry. Since each of the carry select paths is divided into two groups represented by portions 11 and 12, the generation of carry select bits in each group is concurrently made. The half carry bit is therefore provided about the time that the first and second carry-out bits of the highest ranked section adder 64 have been generated, and the half carry bit is used to immediately provide one of the carry-out bits as the output carry bit. Therefore, a very quick sum and output carry bit is provided.

Figure 2:
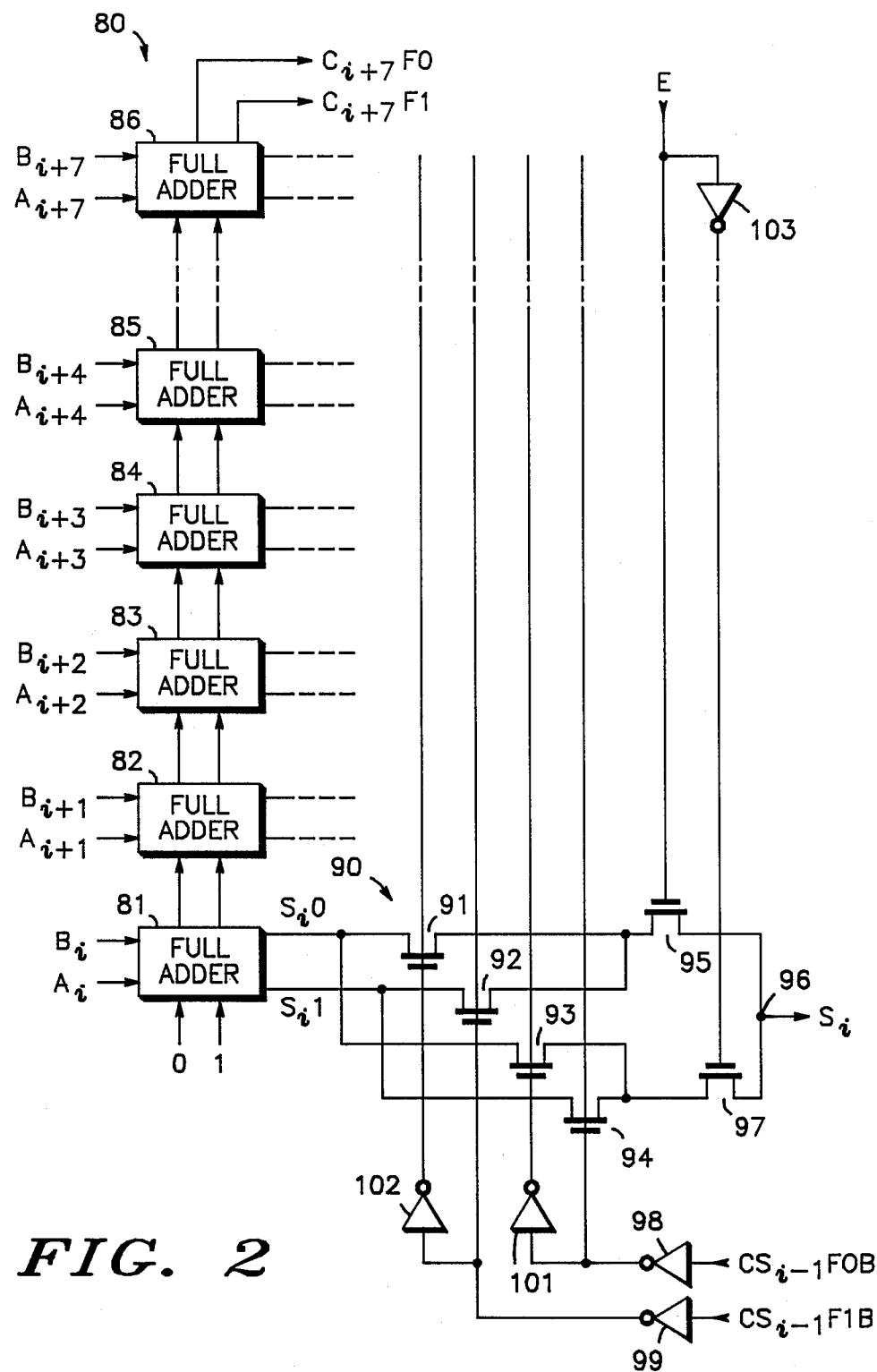
FIG. 2 illustrates in block diagram form one of the section adders illustrated in both FIGS. 1(A) and 1(B).

Shown in FIG. 2 is a detailed diagram which illustrates a section adder 80 which is identical to all of the section adders implemented in adder 10. Section adder 80 comprises a rank ordered plurality of conventional full adders 81–86. In the illustrated form of adder 10, each section adder comprises eight full adders. For convenience of illustration, not all eight full adders are shown in FIG. 2 as is indicated by the dashed lines between full adders 85 and 86. Each full adder receives a predetermined bit of both the A and B operands. Lowest ranked full adder 81 receives a forced logic zero at a first carry input terminal and a forced logic one at a second carry input terminal. All full adders 81–86 comprise first and second carry output terminals coupled to respective carry input terminals of the next higher ranked full adder. The highest ranked full adder 86 provides first and second carry-out bits for the section adder which are coupled to the first and second carry select logic circuits of corresponding rank as shown in FIGS. 1(A) and 1(B).

In the illustrated form, full adder 81 has a first sum output terminal for providing a ranked sum bit assuming a carry-in bit of logic zero, $S_i0$, and a second sum output terminal for providing a ranked sum bit assuming a carry-in bit of logic one, $S_i1$. All remaining full adders provide analogous first and second sum bits as shown by the dashed lines. The first and second sum bits are coupled to a section adder multiplexor having a ranked ordered plurality of sections such as multiplexor section 90. Each section of the section adder multiplexor is connected to a predetermined full adder and functions to provide a single output sum bit based upon carry select bits from the section adder of immediately lower rank. The first output sum bit of full adder 81 is connected to first current electrodes of transistor switches 91 and 93. The second output sum bit of full adder 81 is connected to first current electrodes of transistor switches 92 and 94. Second current electrodes of transistor switches 91 and 92 are both connected to a first current electrode of a transistor switch 95. A second current electrode of transistor switch 95 is connected to an output terminal 96 for providing a ranked output sum bit $S_i$. Second current electrodes of transistor switches 93 and 94 are connected together and to a first current electrode of a transistor switch 97. A second current electrode of transistor switch 97 is connected to output terminal 96. A first carry select signal from an immediately lower ranked section adder assuming a forced carry-in bit of logic zero, labeled $CS_{i-1}F0B$, is coupled to an input of an inverter 98. A second carry select signal from an immediately lower ranked section adder assuming a forced carry-in bit of logic one, labeled $CS_{i-1}F1B$, is coupled to an input of an inverter 99. The first and second carry select signals are active low signals as denoted by the letter "B". An output of inverter 98 is connected to a gate of transistor switch 94 and to an input of an inverter 101. An output of inverter 101 is connected to a gate of transistor switch 93. An output of inverter 99 is connected to a gate of transistor switch 92 and to an input of an inverter 102. An output of inverter 102 is connected to a gate of transistor switch 91. Control signal "E" provided by AND gate 30 of FIG. 1(A) is connected to a gate of transistor switch 95 and to an input of an inverter 103. An output of inverter 103 is connected to a gate of transistor switch 97. In the illustrated form, all transistor switches are N-channel MOS transistors which become conductive in response to logic high state control signals. However, other types of transistors may be used.

In operation, each section adder forms two output sum portions with assumed carry-in bits of zero and one, respectively, and each section adder operates substantially simultaneously. After two sum bits have been generated by each full adder, one of the sum bits is provided as a bit of the output sum in response to the carry select bit from the immediately lower ranked section adder. Therefore, the output sum is provided as an n-bit sum having n bits provided in parallel. With respect to the lowest ranked full adder of each of portions 11 and 12, since these adders cannot receive a carry select bit from an immediately lower ranked section adder within the respective portions, the lowest ranked full adders of each portion is configured slightly differently. In the multiplexor of the lowest ranked full adder, the input carry select bit representing an assumed logic zero carry input, $CS_{i-1}F0B$, is permanently connected to a logic zero level. Analogously, the input carry select bit representing an assumed logic one carry input, $CS_{i-1}F1B$, is permanently connected to a logic one level. As a result, the multiplexor of lowest rank of the sum select multiplexors selects one of the two sum bits generated solely in response to the enable control signal "E".

Control signal "E" is used to enable all sum output terminals. The control signal "E" is generated in both the high order and low order portions of adder 10. As previously noted, in low order portion 12, the value of control signal "E" is provided in response to the value of an output enable signal and the carry input bit. In high order portion 11, the value of control signal "E" is determined by the value of the output enable signal and the half carry bit. The selection of the first or second sum bits is determined only in part by the value of control signal "E" in all other full adders having a rank greater than the lowest rank. As can be seen from FIGS. 1(A) and 1(B), only the two carry-out bits of the highest ranked full adder of each section adder are coupled to the carry select logic to generate the output carry bit of the resulting sum. In this manner, the carry select logic does not have to receive a large amount of inputs so that fan-in problems are avoided. Also, because the half carry bit of the lower ranked portion 12 is generated concurrently with the carry select bits of the higher ranked portion 11, valuable operating time is saved. Further, the half carry bit of lower ranked portion 12 is coupled to the higher ranked portion 11 at the top of higher ranked portion 11 where the bit is used immediately to provide an output carry bit. The sum select function and carry select function are closely integrated to provide an efficient carry select adder.

By now it should be apparent that a fast carry select adder has been provided which functions to minimize carry propagation time for large bit size operands. Efficient data throughput is accomplished as a result of the enhanced speed which is attained. Although the present invention is most useful for bit sizes greater than thirty-two bits, the invention also provides fast addition operations for smaller bit sizes.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

We claim:

1. An n-bit adder circuit, where n is an integer, for simultaneously adding n bits of a first and a second operand with an input carry bit and simultaneously outputting n sum bits and an output carry bit, comprising:

a rank ordered plurality of parallel connected section adders divided into first and second groups, each of said section adders of each group providing a predetermined portion of said n sum bits and comprising:

a rank ordered plurality of full adder circuits, each full adder circuit having a first sum input for receiving a predetermined bit of said first operand, a second sum input for receiving a predetermined bit of said second operand, and first and second carry-in inputs, said first carry-in input of all full adder circuits except a lowest ranked full adder circuit receiving a carry-out bit from a full adder circuit of immediately lower rank resulting from a forced carry-in of logic zero to the first carry-in input of the full adder circuit of lowest rank of each group and said second carry-in input of all full adder circuits except the lowest ranked receiving a carry-out bit from a full adder circuit of immediately lower rank resulting from a forced carry-in of logic one to the second carry-in input of the full adder circuit of lowest rank of each group, a first sum output for providing a first sum bit of predetermined rank resulting from a forced carry-in of logic zero to the lowest ranked adder, a second sum output for providing a second sum bit of the same predetermined rank resulting from a forced carry-in of logic one to the lowest ranked adder, and first and second carry-out bits resulting from a forced carry-in bit of logic one and logic zero to the lowest ranked adder, respectively; and a ranked ordered plurality of first multiplexor means coupled to the first and second sum outputs of each of said full adder circuits, each multiplexor means selecting one of the first or second sum bits provided by each full adder circuit in response to the input carry bit and to first and second carry select signals of predetermined rank, said selected output sum bits representing the output sum;

a first plurality of rank ordered carry select logic means, each carry select logic means coupled to a predetermined section of full adder circuits of each group of section adders and operating substantially simultaneously, the lowest ranked carry select logic means of each group receiving a force carry-in bit of logic one and first and second carry-out bits from the section of full adder circuits of corresponding rank and providing the first carry selected signal of predetermined rank, the remaining carry select logic means of the first plurality in each group receiving the first carry select signal of immediately lower rank and first and second carry-out bits from the section of full adder circuits of corresponding rank and providing the first carry select signal of predetermined rank, said highest ranked carry select logic means providing a first carry output bit resulting from a carry input bit of logic one;

a second plurality of rank ordered carry select logic means, each carry select logic means coupled to a predetermined section of full adder circuits of each group of section adders and operating substantially simultaneously, the lowest ranked carry select logic means of each group receiving a forced carry-in bit of logic zero and first and second carry-out bits from the section of full adder circuits of corresponding rank and providing the second carry select signal of predetermined rank, the remaining carry select logic means of the second plurality in each portion receiving the second carry select signal of immediately lower rank and first and second carry-out bits from the section of full adder circuits of corresponding rank and providing the second carry select signal of predetermined rank, said highest ranked carry select logic means providing a second carry output bit resulting from a carry input bit of logic zero; and second multiplexing means having a single select circuit coupled to the first and second pluralities of carry select logic means of each the first and second portions of section adders, the single select circuit of the first group providing an intermediate carry bit for the second group of section adders and the single select circuit of the second group of section adders providing one of the first or second carry output bits as the output carry bit.

2. The n-bit adder circuit of claim 1 wherein said first plurality of rank ordered carry select logic means comprise:

a rank ordered plurality of AND and NOR logic gates, the lowest ranked AND and NOR logic gates of each group of adders comprising an AND gate with a first input coupled to a first predetermined logic level, a second input coupled to the first carry-out bit of a predetermined full adder circuit of corresponding rank, and an output, and a NOR gate with a first input coupled to the output of the AND gate and a second input coupled to the second carry-out bit of the predetermined full adder circuit of corresponding rank, and an output for providing the first carry select signal of a predetermined rank, the remaining ranked ordered AND and NOR logic gates each comprising an AND gate with a first input coupled to the first carry select signal of immediately lower rank, a second input coupled to the first carry-out bit of a predetermined full adder circuit of corresponding rank, and an output, and a NOR gate with a first input coupled to the output of the AND gate and a second input coupled to the second carry-out bit of the predetermined full adder circuit, and an output for providing the first carry select signal of a predetermined rank.

3. The n-bit adder circuit of claim 2 wherein said second plurality of rank ordered carry select logic means comprise:

a second rank ordered plurality of AND and NOR logic gates, the lowest ranked AND and NOR logic gates of the second plurality in each group of adders comprising an AND gate with a first input coupled to a second predetermined logic level, a second input coupled to the first carry-out bit of a predetermined full adder circuit of corresponding rank, and an output, and a NOR gate with a first input coupled to the output of the AND gate and a second input coupled to the second carry-out bit of the predetermined full adder circuit of corresponding rank, and an output for providing the second carry select signal of a predetermined rank, the remaining ranked ordered AND and NOR logic gates each comprising an AND gate with a first input coupled to the second carry select signal of immediately lower rank, a second input coupled to the first carry-out bit of a predetermined full adder circuit of corresponding rank, and an output, and a NOR gate with a first input coupled to the output of the AND gate, a second input coupled to the second carry-out bit of the full adder circuit of corresponding rank, and an output for providing the second carry select signal of a predetermined rank.

4. The n-bit adder circuit of claim 1 wherein each of the rank ordered plurality of first multiplexor means comprise:
- a first transistor having a first current electrode coupled to the first sum output of a full adder of corresponding rank, a control electrode coupled to the second carry select signal of a predetermined lower rank, and a second current electrode;
- a second transistor having a first current electrode coupled to the second current electrode of the first transistor, a control electrode coupled to the control signal, and a second current electrode coupled to a sum output terminal for selectively providing a predetermined one of said n sum bits;
- a third transistor having a first current electrode coupled to the second sum output of a full adder of of corresponding rank, a control electrode coupled to the second carry select signal of the predetermined rank, and a second current electrode coupled to the first current electrode of the second transistor;
- a fourth transistor having a first current electrode coupled to the first current electrode of the first transistor, a control electrode coupled to the first carry select signal of the predetermined lower rank, and a second current electrode;
- a fifth transistor having a first current electrode coupled to the first current electrode of the third transistor, a second current electrode coupled to the second current electrode of the fourth transistor, and a control electrode coupled to the first carry select signal of the predetermined rank; and
- a sixth transistor having a first current electrode coupled to the second current electrodes of the fourth and fifth transistors, a control electrode coupled to the control signal, and a second current electrode for selectively providing the predetermined one of said n sum bits.

5. The n-bit adder circuit of claim 1 wherein each select circuit of said second multiplexing means comprise:
- a first input for receiving the first carry select signal of highest rank of the group, a second input for receiving the second carry select signal of highest rank of the group, the select circuit of the first group having a control input for receiving the input carry bit and having an output for providing the intermediate carry bit, the select circuit of the second group having a control input for receiving the intermediate carry bit and having an output for providing the output carry bit.

6. An n-bit adder circuit, where n is an integer, for simultaneously adding n bit of a first and a second operand with an input carry bit and substantially simultaneously outputting n sum bits and an output carry bit, comprising:
- a plurality of portions of parallel coupled section adders, each portion of section adders having inputs for receiving in parallel a predetermined number of the bits of each of the first and second operands and substantially simultaneously forming first and second output sum portions, said first and second output sum portions being formed assuming a carry input bit of logic zero and logic one, respectively;
- first and second carry select logic means coupled to each of the portions of parallel coupled section adders, the first and second carry select logic means of each portion of section adders operating substantially simultaneously to provide first and second carry bits in each portion of section adders, the first carry select logic means of each portion providing a first carry bit presuming a carry input bit of logic zero, the second carry select logic means of each portion providing a second carry bit presuming a carry input bit of logic one;
- first multiplexor means comprising a single select circuit coupled to the first and second carry select logic means of each of the portions of section adders, each of said select circuits selecting one of the first and second carry bits of each portion to output as one of a plurality of rank ordered output carry bits in response to an output carry bit of immediately lower rank, the select circuit which outputs the lowest ranked output carry bit selecting one of the first and second carry bits in response to the input carry bit, said output carry bit of highest rank representing the output carry bit of the sum; and
- second multiplexor means coupled to the section adders of each portion of section adders, for selecting one of the first and second output sum portions in each portion of section adders in response to both the first and second carry select logic means to output as the output sum.

7. A method for providing an n-bit adder circuit, where n is an integer, which simultaneously adds n bits of a first and a second operand with an input carry bit and substantially simultaneously outputs a sum having n sum bits and an output carry bit, comprising the steps of:
- providing a predetermined number of portions of parallel coupled section adders, each portion having inputs for receiving in parallel a predetermined number of the bits of each of the first and second operands and for substantially simultaneously forming first and second output sum portions assuming a carry input bit of logic zero and logic one, respectively;
- coupling first and second carry select logic means to each of the portions of parallel coupled section adders, the first and second carry select logic means operating substantially simultaneously to provide a plurality of rank ordered output carry bits equal in number to the number of portions of section adders, the output carry bit of highest rank representing the output carry bit of the sum;
- providing a first carry bit in each portion of the section adders from the first carry select logic means, said first carry bit presuming a carry input bit of logic zero;
- providing a second carry bit in each portion of the section adders from the second carry select logic means, said second carry bit presuming a carry input bit of logic one;
- coupling a single select circuit to the first and second carry select logic means of each of the portions of the section adders, each of the select circuits selecting one of the first and second carry bits in each portion of section adders as one of the ranked output carry bits in response to an output carry bit of immediately lower rank, the lowest ranked output carry bit being provided in response to the input carry bit; and
- coupling multiplexor means to the section adders of each portion of section adders, for selecting one of the first and second output sum portions in each portion of section adders as the output sum in response to both the first and second carry select logic means.

* * * * *